Figure 1:
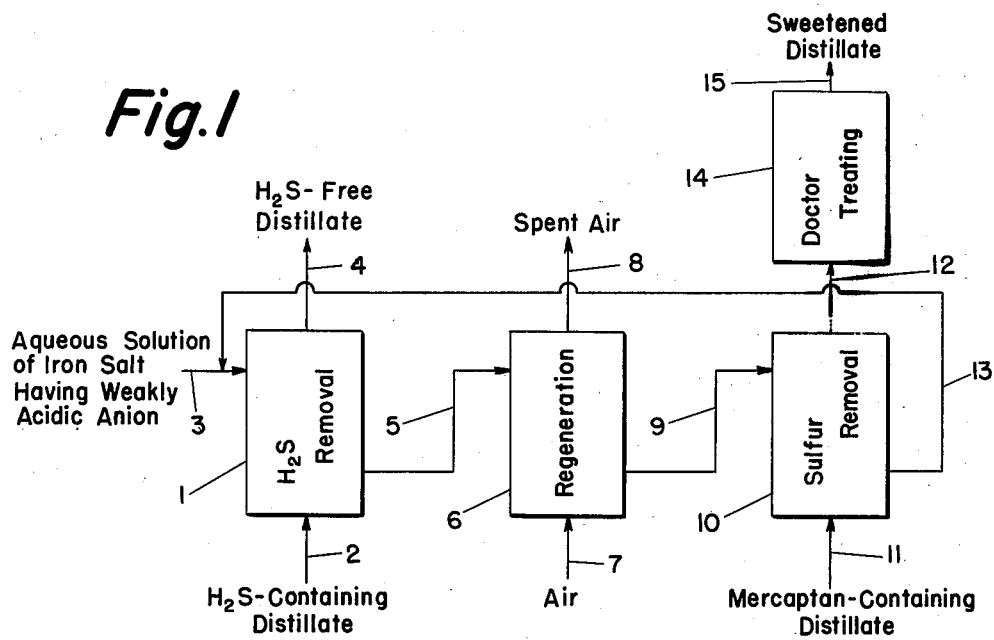

June 9, 1953     K. E. LEUTZ     2,641,571
REMOVAL OF OBJECTIONABLE SULFUR COMPOUNDS
FROM MINERAL OIL DISTILLATES
Filed Dec. 31, 1949

INVENTOR.
KOERNER E. LEUTZ
BY
Busser and Harding
ATTORNEYS

Patented June 9, 1953

2,641,571

UNITED STATES PATENT OFFICE 2,641,571

REMOVAL OF OBJECTIONABLE SULFUR COMPOUNDS FROM MINERAL OIL DISTILLATES

Koerner Edward Leutz, Toledo, Ohio, assignor to Sun Oil Company, Philadelphia, Pa., a corporation of New Jersey Application December 31, 1949, Serial No. 136,209

4 Claims. (Cl. 196—30)

This invention relates to the removal of objectionable sulfur compounds from mineral oil distillates. More particularly, it relates to the removal of objectionable sulfur compounds including hydrogen sulfide from mineral oil distillates by contact in liquid phase with a regenerable aqueous treating agent.

The presence of hydrogen sulfide in light mineral oil distillates, e. g. gasoline, kerosene, and naphtha, cannot, as a general rule, be tolerated. Therefore, removal of hydrogen sulfide from such distillates is a frequently necessary refining operation. Up to the present time, a variety of methods have been proposed for hydrogen sulfide removal, but none is without serious disadvantage.

The most widely practiced method is caustic soda treatment, wherein the distillate is contacted in liquid phase with aqueous sodium hydroxide. During the period of contact, hydrogen sulfide is removed from solution in the oil to react with sodium hydroxide and form compounds which are removed with the caustic sludge obtained by separation from the distillate. The use of caustic soda for removal of hydrogen sulfide is so generally practiced that, where hydrogen sulfide containing distillates are concerned in the prior art, caustic treatment is impliedly the initial refining step, whether it is specifically disclosed or not.

Caustic soda treatment, though widely used, has the disadvantage that the caustic sludge formed is not readily regenerable. Usual practice is to discard the sludge. However, even the latter course is not completely satisfactory, because it is frequently difficult to dispose of the sludge in such a way as to prevent its constituting a public nuisance.

The present invention provides a method for hydrogen sulfide removal utilizing an aqueous treating agent which can be readily regenerated, thereby making possible considerable economies in the cost of the treating agent, and also eliminating the problem of disposing of large quantities of spent treating agent.

The invention also provides, using such a treating agent, a method whereby the hydrogen sulfide content of distillates can be converted to elementary sulfur, which can be incorporated in mercaptan-containing distillates, in order to prepare the latter distillates for doctor treatment.

Doctor treatment is a method for removing objectionable sulfur compounds including mercaptans from distillates, and involves contacting such distillates with an aqueous solution of sodium plumbite. In order to convert the mercaptans to non-objectionable sulfur compounds, it is necessary that elementary sulfur, in a definite quantity relative to the amount of mercaptans, be present in the distillate charged to the doctor treatment or at least be present during the final stage of the doctor treatment.

According to one embodiment of the present invention, hydrogen sulfide is removed from distillates by contacting the latter with a treating agent comprising an aqueous solution of a soluble iron salt having a weakly acidic anion. In another embodiment, the invention contemplates the use of such a treating agent for converting hydrogen sulfide to elementary sulfur and adding the latter to a mercaptan-containing distillate which contains no elementary sulfur or elementary sulfur in amount substantially less than that required by the necessary proportion of elementary sulfur to mercaptans in the distillate. By adding enough sulfur to obtain the required ratio of sulfur to mercaptans, the mercaptan-containing distillate is prepared for optimum doctor treating.

The treating agent employed according to the invention comprises an aqueous solution of a soluble iron salt, i. e. an iron salt having solubility in water greater than 10 grams per liter at ordinary temperatures without heating, the salt having a weakly acidic anion, i. e. an anion which forms with hydrogen an acid having a dissociation constant less than $10^{-2}$. Examples of suitable solutes according to the above definition are ferrous acetate, ferric formate, ferrous lactate, and ferrous tartrate, but other soluble iron salts having weakly acidic anions are also suitable. Ferrous acetate has been found particularly suitable.

The treating agent is preferably acidic, because it has been found that neutral or alkaline treating agents are not readily regenerated according to the invention. The pH of the treating agent is, therefore, preferably below 7, but preferably at least 4, because at lower pH the treating agent becomes unduly corrosive. Generally, iron salts as specified above, when dissolved in water, form solutions having pH at least 4 but below 7. For example, a 0.5 molar solution of ferrous acetate has pH about 5.4.

The concentration of iron salt in the treating agent may vary. Concentrations within the range 50-200 grams per liter are preferred from an economic standpoint.

In the process of the invention, a treating agent as described above is contacted with a mineral oil distillate containing hydrogen sulfide, and hydrogen sulfide is removed from the distillate to react with iron in the treating agent and to thereby form iron sulfide precipitate in the treating agent. The reaction proceeds at a satisfactory rate, even in an acidic aqueous medium, probably because the hydrogen ion formed in the precipitation reaction reacts, as it is formed, with the excess weakly acidic anion in the treating agent to form an only slightly ionized acid molecule; thus the hydrogen ion concentration is prevented from building up and retarding, by the mass action effect, the precipitation reaction.

When the treating agent becomes contaminated by iron sulfide accumulation, it may be regenerated by oxidizing the iron sulfide to form elementary sulfur. Such oxidation may be accomplished by contacting the contaminated treating agent with free-oxygen containing gas, e. g. air.

The regenerated treating agent contains elementary sulfur in suspension. Before re-using the regenerated treating agent for hydrogen sulfide removal, the elementary sulfur is removed by any suitable means. When ferrous acetate solution is used as the treating agent, it has been found that upon regeneration by oxidation, almost all of the iron in the treating agent goes back into solution. Thus, when the oxidation has been carried to a certain point, the solid material in the treating agent consists essentially of elementary sulfur, and the latter may be filtered from the treating agent or removed by settling and decantation to obtain a clear, practically colorless ferrous acetate solution suitable for reuse in removing hydrogen sulfide from distillates. When, however, the oxidation is carried too far beyond the point where nearly all the iron has gone back into solution, solid ferric basic acetate tends to form in the treating agent. In cases where the regenerated treating agent contains substantial quantities of such ferric basic acetate, removal of elementary sulfur by filtration or decantation is not feasible because of the iron loss from the treating agent that would result, and other separation methods are used, e. g. a flotation method wherein the treating agent is agitated with a gas under conditions such that the sulfur becomes concentrated in a removable layer of foam above the treating agent.

A preferred method, however, for removing elementary sulfur, whether or not the regenerated treating agent contains solids other than sulfur, is by extracting sulfur from the regenerated treating agent by contact with a mercaptan-containing distillate, thereby increasing the elementary sulfur content of that distillate to an optimum value for subsequent doctor treatment.

When the hydrogen sulfide containing distillate treated according to the invention also contains mercaptans, that same distillate may be used, after hydrogen sulfide removal, for extraction of sulfur from the regenerated treated agent, thereby producing a distillate containing mercaptans and elementary sulfur in proportions suitable for subsequent doctor treatment. However, when the above situation prevails, it is preferred that the hydrogen sulfide removal, treating agent regeneration, and sulfur removal steps be performed substantially simultaneously in a single operation by contacting a distillate simultaneously with free-oxygen containing gas and with the treating agent. When this is done, hydrogen sulfide removal from the distillate, iron sulfide oxidation, and sulfur extraction by the distillate occur simultaneously. Thus, in effect, a distillate containing hydrogen sulfide and mercaptans is contacted with an aqueous treating agent comprising a dissolved iron salt and suspended iron sulfide and elementary sulfur, and has its hydrogen sulfide content thereby replaced with elementary sulfur. The distillate containing mercaptans and elementary sulfur is then doctor treated. The treating agent is continuously regenerated and can be used for treating an indefinite quantity of distillate.

Hydrogen sulfide removal by contact with a treating agent according to the invention is preferably conducted at ordinary temperature without heating; little advantage is to be derived from contacting at elevated temperature. However, regeneration of contaminated treating agent by oxidation of iron sulfide therein proceeds more rapidly at elevated temperature than at ordinary temperature without heating. Therefore, when hydrogen sulfide removal and treating agent regeneration are performed simultaneously in a single operation, it may be advisable in some instances to operate at elevated temperature.

Figure 2:
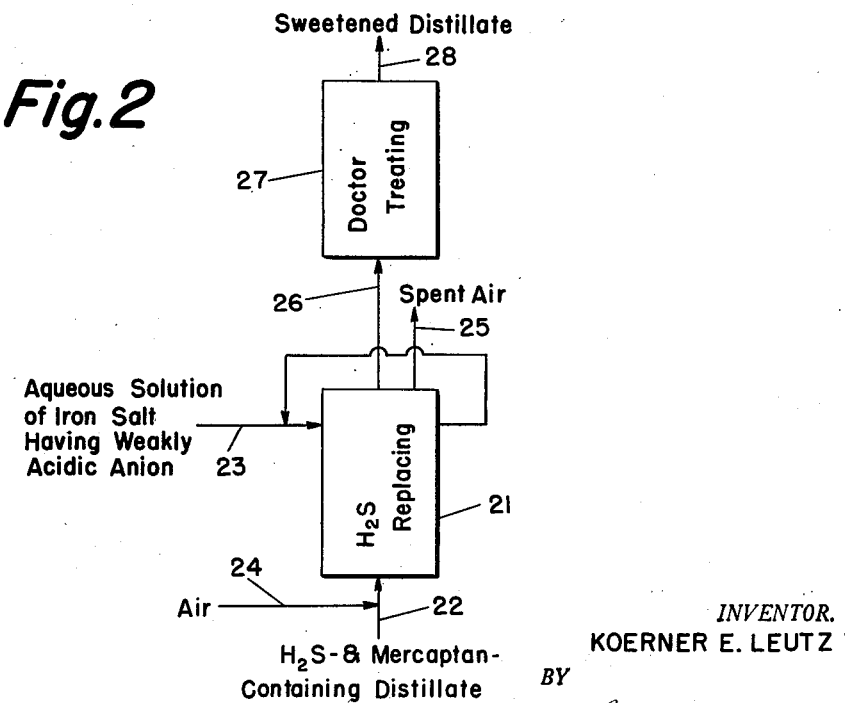

The invention will be described in further detail with reference to the attached drawings. Figure 1 illustrates a method for removing hydrogen sulfide from a distillate containing the same by contacting the distillate with a regenerable treating agent comprising an aqueous solution of a soluble iron salt having a weakly acidic anion; Figure 1 also shows such hydrogen sulfide removal as a step in a larger process whereby a mercaptan-containing distillate is also prepared for doctor treatment. Figure 2 illustrates a preferred method of replacing hydrogen sulfide with elementary sulfur in a mercaptan-containing distillate, thereby preparing that distillate for doctor treatment.

Turning now to Figure 1, a light petroleum distillate containing hydrogen sulfide is introduced by way of line 2 into hydrogen sulfide removal apparatus 1, which may be any apparatus suitable for contacting and subsequently separating two immiscible liquid phases; contacting and separating is preferably continuous, as obtained for example with countercurrent flow through a packed tower. Through line 3, a treating agent according to the invention is introduced into hydrogen sulfide removal apparatus 2. Treated distillate having its hydrogen sulfide content substantially reduced or eliminated by contact with the treating agent is removed through line 4.

Contaminated treating agent, containing in suspension iron sulfide formed upon contact with hydrogen sulfide containing distillate, is removed from hydrogen sulfide removal apparatus through line 5 and introduced into treating agent regeneration apparatus 6, which may be any apparatus for contacting and subsequently separating, preferably continuously, a gas and a liquid containing solids in suspension. Air is introduced into regeneration apparatus 6 through line 7; spent air, depleted in oxygen content by contact with contaminated treating agent, leaves regeneration apparatus 6 through line 8.

Regenerated treating agent, containing in suspension elementary sulfur formed by oxidation of iron sulfide, is removed from regeneration apparatus 6 through line 9 and introduced into sulfur removal apparatus 10, which may be any apparatus suitable for contacting and subsequently separating, preferably continuously, two immiscible liquid phases, one of which contains solids in suspension. A mercaptan-containing distillate, which should be substantially free of hydrogen sulfide, and which contains either no elementary sulfur or elementary sulfur in molar amount substantially less than that required for the mercaptans, is introduced into sulfur removal apparatus 10 through line 11. The relative rates of introduction of regenerated treating agent through line 9 and of mercaptan-containing distillate through line 11 are adjusted in such a way that the contacted distillate withdrawn through line 12 contains elementary sulfur and mercaptans in the proportions necessary for doctor treating. It is within the ability of a person skilled in the art to determine for a given mercaptan-containing distillate the quantity of elementary sulfur required for doctor treating.

Regenerated desulfurized treating agent is removed from sulfur removal apparatus 10 through line 13 and returned, by way of line 3, to hydrogen sulfide removal apparatus 1 for further contact with hydrogen sulfide containing distillate. The sulfur and mercaptan-containing distillate withdrawn from sulfur removal apparatus 10 through line 12 is introduced into doctor treating apparatus 14, which may be of any type known in the doctor treating art. By virtue of the fact that the distillate in line 12 has been adjusted to the proper sulfur-mercaptan ratio, no additional sulfur need be added to the doctor treating operation, and sweetened distillate containing no objectionable sulfur compounds is withdrawn through line 15.

In operation according to Figure 1, it is to be understood that part of the treating agent may bypass the regeneration and sulfur removal operations in the treating agent cycle.

If the hydrogen sulfide containing distillate in line 2 also contains mercaptans, it is within the scope of the invention to utilize the mercaptan-containing, $H_2S$-free, distillate in line 4 as the extracting distillate introduced into sulfur removal apparatus 10 through line 11. Such operation is, however, unnecessarily costly in that it involves three steps separately performed which can be replaced by one step, as shown in Figure 2.

In Figure 2, a light mineral oil distillate containing both hydrogen sulfide and mercaptans is introduced through line 22 into hydrogen sulfide replacing apparatus 21, which may be any apparatus suitable for contacting and subsequently separating, preferably continuously, two immiscible liquid phases, one containing suspended solids, in the presence of a gas. Through line 23, a treating agent according to the invention is introduced into hydrogen sulfide replacing apparatus 21. Air is introduced through line 24 into line 22, but it is within the scope of the invention to introduce air separately into hydrogen sulfide replacing apparatus 21.

Treating agent may either be circulated continuously through hydrogen sulfide replacing apparatus 21, or it may be permanently disposed therein, while air and distillate are continuously passed therethrough. In either case, when operation has become stabilized, the treating agent within apparatus 21 is an aqueous suspension of iron sulfide and elementary sulfur in a solution of an iron salt, and the treating agent continuously removes hydrogen sulfide from the distillate, gives up sulfur to the distillate, and has its iron sulfide content oxidized to elementary sulfur by the air.

The distillate withdrawn through line 26 has given up hydrogen sulfide to the treating agent and has extracted elementary sulfur therefrom. The rates of introduction of air, distillate, and treating agent into apparatus 21 are so adjusted that the distillate withdrawn through line 26 contains elementary sulfur in molar amount preferably not substantially greater than that required for the mercaptans. If the hydrogen sulfide content of the distillate in line 22 is greater than the amount which, upon conversion to elementary sulfur, yields the required amount of the latter, a portion of the treating agent may be removed from apparatus 21 and separately treated for sulfur removal according to the method illustrated in Figure 1.

Deficiencies of either elementary sulfur or mercaptans in the distillate in line 26 can also be corrected by addition thereto from external sources of similar distillates which are rich in mercaptans or elementary sulfur respectively.

It is to be understood that, where doctor treating is disclosed in the present specification, other known processes, which require definite quantities of elementary sulfur in relation to mercaptan content of the distillate charged, are to be considered substantially equivalent.

I claim:

1. Method for removing hydrogen sulfide from a light mineral oil distillate by use of a treating agent which is regenerated during the process which comprises: contacting an $H_2S$-containing light mineral oil distillate in liquid phase with a liquid aqueous treating agent comprising an aqueous solution of an iron salt having a weakly acidic, organic anion and having solubility in water greater than 10 grams per liter at ordinary temperatures without heating, thereby to react hydrogen sulfide in said distillate with said iron salt to form iron sulfide in said aqueous treating agent; contacting said aqueous treating agent with free-oxygen-containing gas thereby to react said iron sulfide in said aqueous treating agent with the oxygen in said gas to form elemental sulfur in said aqueous treating agent and to regenerate said aqueous treating agent; and reusing the regenerated treating agent for contacting with additional $H_2S$-containing light mineral oil distillates.

2. Method according to claim 1 wherein said distillate contains mercaptans and is simultaneously contacted with said aqueous treating agent and with said free-oxygen-containing gas.

3. Method according to claim 1 wherein the used treating agent containing iron sulfide in suspension is separated from said distillate before contacting said iron sulfide with said free-oxygen-containing gas.

4. Process for removing hydrogen sulfide from a light mineral oil distillate by use of a treating agent which is regenerated during the process which comprises: contacting an $H_2S$-containing light mineral oil distillate in liquid phase with a liquid aqueous treating agent comprising an aqueous solution of a salt selected from the group consisting of iron acetate, iron tartrate, iron formate, and iron lactate, thereby to react hydrogen sulfide in said distillate with said salt to form iron sulfide in said aqueous treating agent; contacting said aqueous treating agent with free-oxygen-containing gas thereby to react said iron sulfide in said aqueous treating agent with the oxygen in said gas to form elemental sulfur in said aqueous treating agent and to regenerate said aqueous treating agent; and reusing the regenerated treating agent for contacting additional H₂S-containing light mineral oil distillate.

KOERNER EDWARD LEUTZ.

References Cited in the file of this patent

UNITED STATES PATENTS

| Number | Name | Date |
|---|---|---|
| 83,417 | Spence | Oct. 27, 1868 |
| 487,119 | Frasch | Mar. 22, 1892 |
| 723,368 | Colin | Mar. 24, 1903 |
| 1,448,643 | Ditmor | Mar. 13, 1923 |
| 1,799,780 | Caplan | Apr. 7, 1931 |
| 1,947,869 | Morrell et al. | Feb. 20, 1934 |
| 1,993,140 | Hamilton et al. | Mar. 5, 1935 |

FOREIGN PATENTS

| Number | Country | Date |
|---|---|---|
| 48 of 1863 | Great Britain | July 6, 1863 |